July 12, 1949.    J. J. SMITH    2,476,120
METER HANGER
Filed Sept. 22, 1947
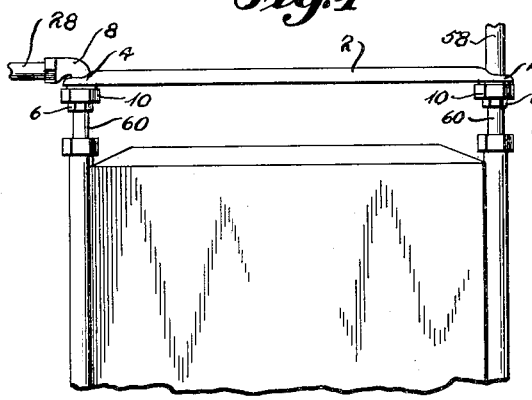
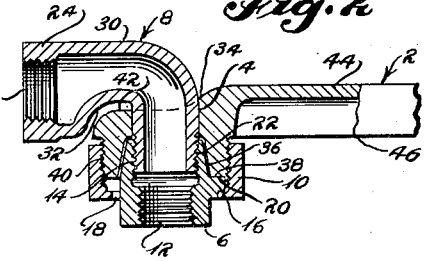
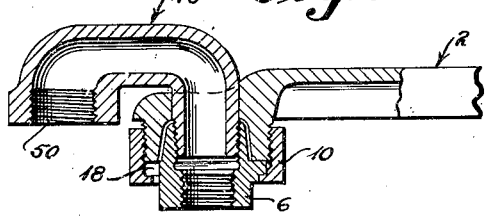
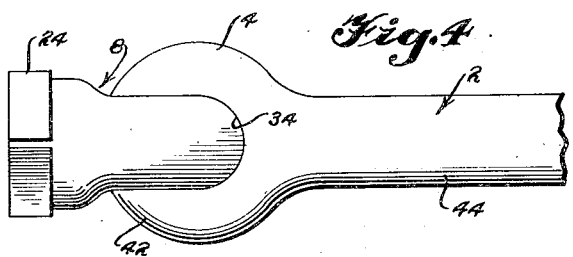
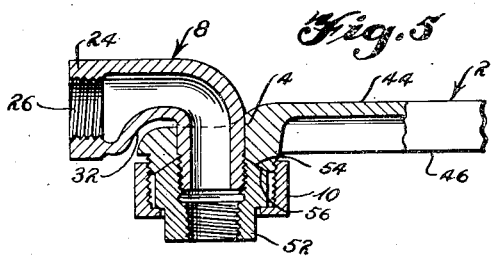
INVENTOR.
John J. Smith
BY
Cushman, Darby & Cushman
ATTORNEYS Patented July 12, 1949

2,476,120

UNITED STATES PATENT OFFICE 2,476,120

METER HANGER

John J. Smith, Decatur, Ill., assignor to Mueller Co., Decatur, Ill., a corporation of Illinois Application September 22, 1947, Serial No. 775,439

1 Claim. (Cl. 285—3)

This invention relates to meter hangers. More particularly, it is concerned with devices for connecting meters, such as gas meters, to a pair of service pipes and maintaining the service pipes at a predetermined, spaced distance from one another to prevent injury to the meter by possible movement of the service pipes.

A principal object of this invention is the provision of a new style, one-piece, rigid bar, meter hanger which materially reduces the vertical length of the assembled connection from the top of the installed meter to the top portion of the meter hanger assembly.

A further object is the provision of meter hangers of the indicated type which are especially suited for installation of meters in warmer sections of the country and in buildings or dwellings where there is a minimum of vertical space or head room for the accommodation of the meter.

Still further objects will become apparent from the detailed description given hereinafter in connection with the attached drawing, in which:

Figure 1 is a side elevation of one form of my meter hanger diagrammatically illustrating its use in the installation of a meter;

Figure 2 is a sectional side view of one form of my meter hanger;

Figure 3 is a sectional side view of another form of my meter hanger;

Figure 4 is a top view of the meter hanger shown in Figure 2;

Figure 5 is a sectional side view of a modified form of my meter hanger.

Referring in detail to the drawings, the meter hanger consists essentially of a rigid, one-piece bar 2 having an enlarged annular end 4, a hollow, straight connector 6, an arcuate tubular connector 8, and a coupling nut 10.

The hollow connector 6 is provided at both ends with inside threaded sections 12 and 14, and a centrally located outside annular flange 16. The flange 16 is provided at one portion with a slot 18 which serves to permit moisture which condenses within the hanger unit to drain from the unit when the unit is assembled. The top surface 20 of the flange 16 is ground to form a seating surface.

The tubular connector 8 is provided at one end with an outside threaded section 22, which is adapted to screw-thread into the inside threaded section 14 of the connector 6. The opposite end 24 of the connector 8 is enlarged and provided with inside threads 26 which are adapted to receive service pipes 28. As can be seen from Figure 2, the tubular connector 8 is cast so that the outside edge 30 of the connector forms a smooth arch, while the inside edge 32 is sharply contoured to conform very closely to a right angle.

The enlarged annular end 4 or boss on the bar 2 has an opening therethrough which is restricted at the upper portion 34 and has an enlarged conically-shaped bottom portion 36 which is adapted to receive the upper part of the hollow connector 6. The bottom edge of the boss 4 is ground to form a seating surface 38 upon which the seating surface 20 of the connector 6 may sit. Outside threads 40 are provided on the boss 4 upon which the coupling nut 10 screw-threads in order to force the connector 6 within the boss opening 36 with the seating surfaces 38 and 20 engaged.

It will be observed that the boss 4 is displaced below the bar 2 so that the top surface 42 of the boss is below the top surface 44 of the bar with the midpoint of the boss below the bottom edge 46 of the bar. As a result of this displacement of the boss, the tubular connector 8 will fit into the assembly with an appreciable portion of the opening 26 located below the level of the top edge 44 of the bar and the portion of the side 32 of the connector 8 which passes over the top 42 of the boss is below the level of the edge 44 of the bar.

The modification of the embodiment of my meter hangers as shown in Figure 2 in comparison with that shown in Figure 3 is that the connector 48 in this case is U-shaped rather than L-shaped, so that the end 50 of the connector points downwardly when assembled in the unit. This modified form is employed for installation of meters with vertically rising service pipes rather than with horizontal service pipes, for which the form shown in Figure 2 is employed.

In the modification illustrated in Figure 5, a bevel type construction of coupling between the hollow connector 52 and the boss 4 is employed. Thus, in this case, the bottom side of the boss 4 is provided with a flared edge 54 and the top side of the connector 52 with a corresponding bevel edge 56 which form the seating surfaces between the boss 4 and the connector 54. Otherwise, the embodiment illustrated in Figure 5 is comparable to the unit illustrated in Figure 2.

Meter hangers according to this invention are installed by a procedure which is similar to that used with meter hangers employed heretofore. Thus, the connector 8 is first threaded onto the service pipe 28. Then the bar 2 is slipped at one end over the connector 8 and at the other end over service pipe 58. The connector 6 is then threaded upon the lower end of the connector 8 and the connector 6 is threaded upon the lower end of the pipe 58, after which coupling nuts 10 are slipped over both installed connectors 6. Then meter swivels 60 are threaded into the lower ends of the connectors 6 and finally, the coupling nuts 10 are tightened upon the bosses 4 completing the assembly of the unit.

I claim:

A meter hanger comprising a rigid, one-piece bar, a boss on an end of the bar, an opening through the boss which is restricted at the upper end, a hollow connector having inside threads at one end, said end being adapted to fit into the lower end of said boss opening, a seating surface on the boss adapted to engage a corresponding seating surface on the connector, outside threads on the lower end of the boss, a coupling nut adapted to screw-thread upon said boss threads and force said connector within the lower end of the boss opening with said seating surfaces engaged, an arcuate, tubular connector having an outside threaded section at one end adapted to screw-thread into the upper end of said first-named connector, the level of the top surface of the boss being below the top edge of the bar a sufficient distance that the bottom portion of said arcuate connector which bends over the top of the boss will be located below the level of the top of said bar when said arcuate connector is assembled in the boss.

JOHN J. SMITH.

REFERENCES CITED

The following references are of record in the file of this patent:

UNITED STATES PATENTS

| Number | Name | Date |
|---|---|---|
| 1,890,540 | Hawkins | Dec. 13, 1932 |